United States Patent
He

(10) Patent No.: US 7,436,752 B2
(45) Date of Patent: Oct. 14, 2008

(54) METHOD AND APPARATUS FOR SIGNAL EQUALIZATION IN A LIGHT STORAGE SYSTEM

(75) Inventor: Wei-Hung He, Taipei Hsien (TW)

(73) Assignee: Realtek Semiconductor Corp., HsinChu (TW)

(*) Notice: Subject to any disclaimer, the term of this patent is extended or adjusted under 35 U.S.C. 154(b) by 573 days.

(21) Appl. No.: 11/164,320

(22) Filed: Nov. 17, 2005

(65) Prior Publication Data

US 2007/0109950 A1    May 17, 2007

(51) Int. Cl.
*G11B 20/10* (2006.01)
(52) U.S. Cl. .................. 369/124.11; 369/59.15
(58) Field of Classification Search ............ 369/59.15, 369/59.16, 59.18, 59.22, 124.1, 124.11, 124.13; 360/65
See application file for complete search history.

(56) References Cited

U.S. PATENT DOCUMENTS

| | | | |
|---|---|---|---|
| 5,124,850 A * | 6/1992 | Kizu | 360/65 |
| 5,237,588 A | 8/1993 | Tanaka et al. | |
| 5,276,517 A * | 1/1994 | Matsuzawa et al. | 360/65 |
| 5,751,232 A * | 5/1998 | Inoue et al. | 341/63 |
| 6,845,134 B2 | 1/2005 | Stek et al. | |

\* cited by examiner

Primary Examiner—Thang V Tran
(74) Attorney, Agent, or Firm—Winston Hsu

(57) ABSTRACT

A method and apparatus for signal equalization in a light storage system is disclosed. The method includes observing run length of an RF signal read from the optical disc; classifying run lengths into sets; calculating the mean of certain run lengths; comparing the values with expected values of said run lengths to generate an error value; and adjusting equalizing parameters of boost and frequency if the error value lies outside an expected range.

16 Claims, 3 Drawing Sheets

METHOD AND APPARATUS FOR SIGNAL EQUALIZATION IN A LIGHT STORAGE SYSTEM

BACKGROUND OF THE INVENTION

1. Field of the Invention

The present invention relates to signal equalization, and more particularly, to a method and apparatus of signal equalization in an optical disc drive system.

2. Description of the Prior Art

In a read channel of a light storage system, a pick-up head of the light storage system reads information from an optical disc to generate a radio-frequency (RF) signal. The RF signal is then processed by a specific low-pass filter and an equalizer. A phase-locked device synchronizes the processed RF signal and the pit/land can be scanned according to the clock of the synchronization signal.

Performance of the read channel relates to jitters between edge timing of the RF data and synchronization signals. The frequency response of the signals read from an optical disc varies from disc to disc. When reading from different disc, the EQ parameters must be adjusted accordingly to obtain the optimum equalizing performance. For variances of the optical discs and the read channel, as well as different requirements for rotational speed, the low-pass filter and the equalizer of the read channel must be adjusted to meet the jitter performance. The conventional adjusting method for the low-pass filter and equalizer is to look up a table for choosing parameters of filters and equalizers according to the types of discs, and utilize a method of trial and error to adjust the parameters to meet the jitter performance.

SUMMARY OF THE INVENTION

It is therefore one of the objectives of the present invention to provide an apparatus and method for signal equalization in an optical disc system, to solve the above-mentioned problem.

The claimed method involves monitoring the run length of an outputted signal to determine which direction to vary the equalizing parameters.

Briefly described, a method for signal equalization in a light storage system is disclosed. The method comprises: monitoring the run lengths of the signal read from the optical disc; classifying the run lengths into sets; calculating a first average value of a first run length set; calculating a second average value of a second run length set; comparing the first average value of the first run length set with an expected value of that run length set; adjusting a first equalizing parameter in order to make the first average value approximately equal to the expected value of that run length set; comparing the second average value of the second run length set with an expected value of that run length set; adjusting a second equalizing parameter in order to make the second average value approximately equal to the expected value of that run length set; and alternately adjusting first and second equalizing parameters.

An apparatus of signal equalization in a light storage system is also disclosed. The apparatus comprises a run length meter and a processor. The run length meter comprises: a measuring module for measuring a plurality of run lengths of the signal; a classifying module, coupled to the measuring module, for classifying measured run lengths into a plurality of run length sets; a calculating module, coupled to the classifying module, for calculating a first average value of a first run length set corresponding to a first run length and for calculating a second average value of a second run length set corresponding to a second run length; and a comparing module, coupled to the calculating module, for comparing the first average value with a first expected value of the first run length set to determine a first difference value and for comparing the second average value with a second expected value of the second run length set to determine a second difference value. The processor, coupled to the equalizer and the run length meter, is used for adjusting a first equalizing parameter to reduce the first difference value and adjusting a second equalizing parameter to reduce the second difference value until the first difference value falls within a first range and the second difference value falls within a second range.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
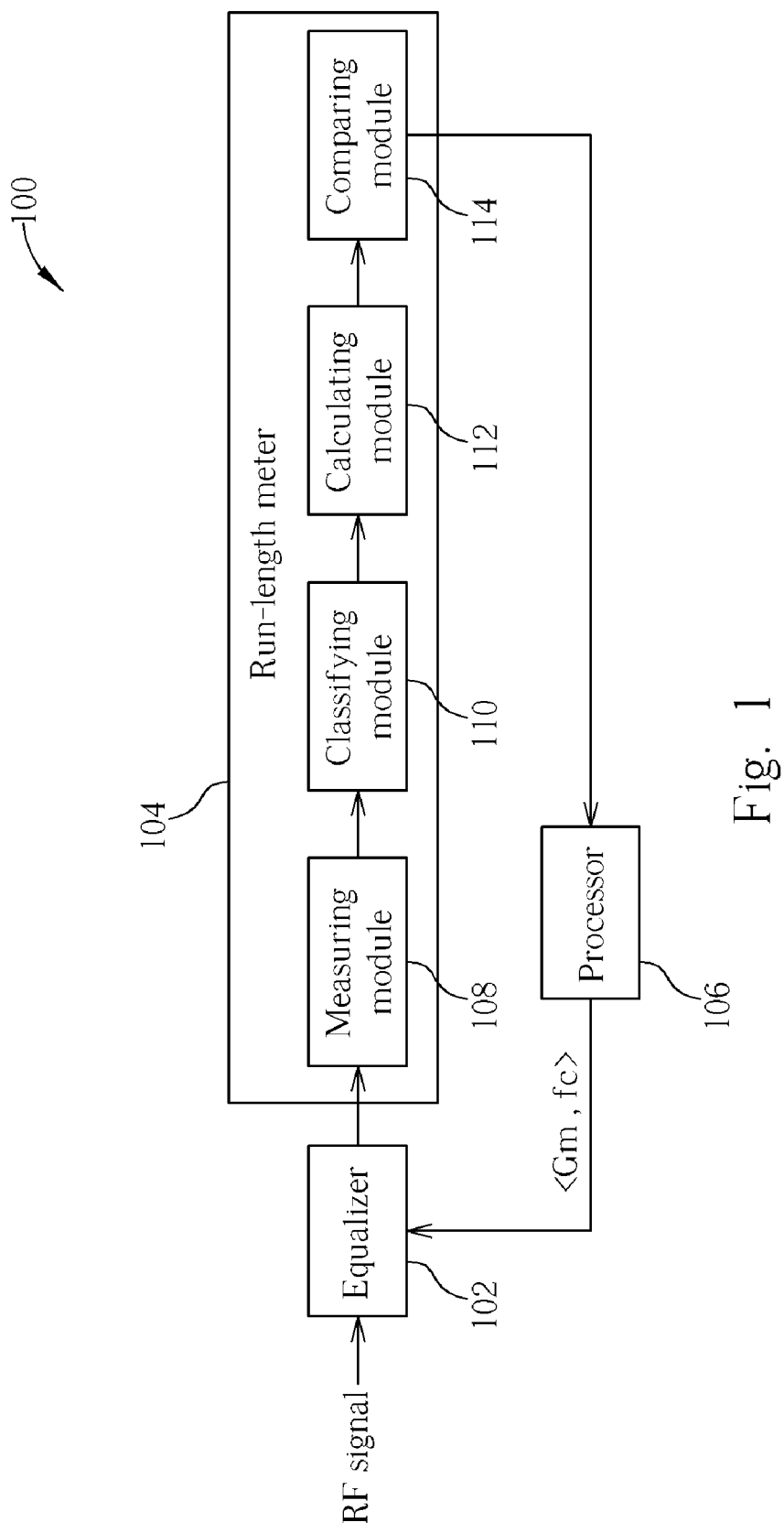
FIG. 1 is a diagram of an equalizing circuit according to an embodiment of the present invention.

The present invention provides a method and apparatus for equalizing the frequency response of an optical disc signal by utilizing the run length of the optical disc signal. Please refer to FIG. 1, which is a diagram of an equalizing circuit 100 according to an embodiment of the present invention. In this embodiment, the equalizing circuit 100 comprises an equalizer 102; a run length meter 104; and a processor (e.g. a DSP) 106. The run length meter 104 comprises a measuring module 108, a classifying module 110, a calculating module 112, and a comparing module 114.

As shown in FIG. 1, the equalizing circuit 100 is coupled to a photo detector of a pick-up head for receiving an RF signal generated from the photo detector. The optical pick-up head scans the surface of an optical disc, and then the photo detector therein converts the received reflected laser beams into an RF signal and sends the RF signal to the equalizer 102, which sets initial parameters of boost (i.e. gain) and central frequency for equalizing the RF signal. The run length meter 104 detects all run lengths present in the RF signal from 3T to 11T in multiples of T, by utilizing the measuring module 108 to measure all run lengths, and utilizing the classifying module 110 to classify run lengths into run length sets from 3T to 11T. In this embodiment, the measuring module 108 is implemented by utilizing an interpolator to over-sample the RF signal, an edge detector to find zero-crossing points of the over-sampled RF signal, a run length counter to count the number of points between every two zero-crossings, and a run length selector to obtain the run length of a particular pulse through the number of points counted between zero-crossings. However, the scope of the invention is not limited to this embodiment. Any known circuit architecture capable of measuring the run lengths can be adopted to act as the desired measuring module 108.

Dimensions of the equalizer 102 represent sets of parameters. In this embodiment, the parameters of the equalizer 102 are adjusted to change the dimensions of the equalizer 102.

The calculating module 112 calculates a first average value of a first run length set and calculates a second average value of a second run length set, where in this embodiment the first run length set and the second run length set are the 3T run length and 4T run length respectively. However, the selection of the first run length set and second run length set is adjustable. For example, in another embodiment of the present invention, the 4T run length set and the 5T run length set are utilized to tune the parameters set to the equalizer 102.

Utilizing the comparing module 114, a first error value is generated by subtracting a first expected value from the first average value of the first run length set, where in this embodiment the first expected value is equal to 3T. If the first error value lies outside a first range delimited by two threshold values $T_1$ and $T_2$, the processor 106 will implement an algorithm to the equalizer 102 in order to adjust a first equalizing parameter until the first error value lies within the desired first range. Please note that the first expected value is not limited to be 3T. If the above-mentioned desired first range is properly adjusted, the first expected value can be different from 3T, such as 3T+Δ. Then the threshold values for this expected value 3T+Δ are adjusted to be $T_1$+Δ and $T_2$+Δ, accordingly. The objective of tuning the equalizing parameters is still achieved.

Once the average value of run lengths in the 3T run length set is approximately equal to the first expected value, a second error value is generated by subtracting a second expected value from the second average value of the second run length set, where in this embodiment the second expected value is equal to 4T. Please note that the second expected value is not limited to be 4T. If the second error value lies outside a desired second range delimited by two threshold values $T_3$ and $T_4$, the processor 106 will implement another algorithm to the equalizer 102 in order to adjust a second equalizing parameter until the second error value lies within the second range. Please note that the second expected value is not limited to be 4T exactly. The second expected value is allowed to be different from the ideal value, 4T. For example, if the above-mentioned desired second range is properly adjusted, the second expected value is allowed to be different from 4T. The same goal of tuning the equalizing parameters is achieved. The first equalizing parameter and the second equalizing parameter are boost $G_m$ and central frequency $f_c$ respectively. However, these equalizing parameters are for illustrative purposes only, and not meant to be limitations.

The method of equalizing the RF signal response will now be described in detail. The RF signal contains a plurality of run lengths in multiples of T. Please note that, as mentioned above, any two run length sets can be utilized, but 3T and 4T are ideally chosen as they are affected the most by boost and central frequency. The choice of these run lengths is not intended to be a limitation of the present invention, however. Through the utilization of the measuring and classifying modules 108 and 110, the 3T and 4T run lengths in the read signal are identified from a plurality of run length sets and the average values of the 3T and 4T run lengths in the read signal are calculated.

Figure 2:
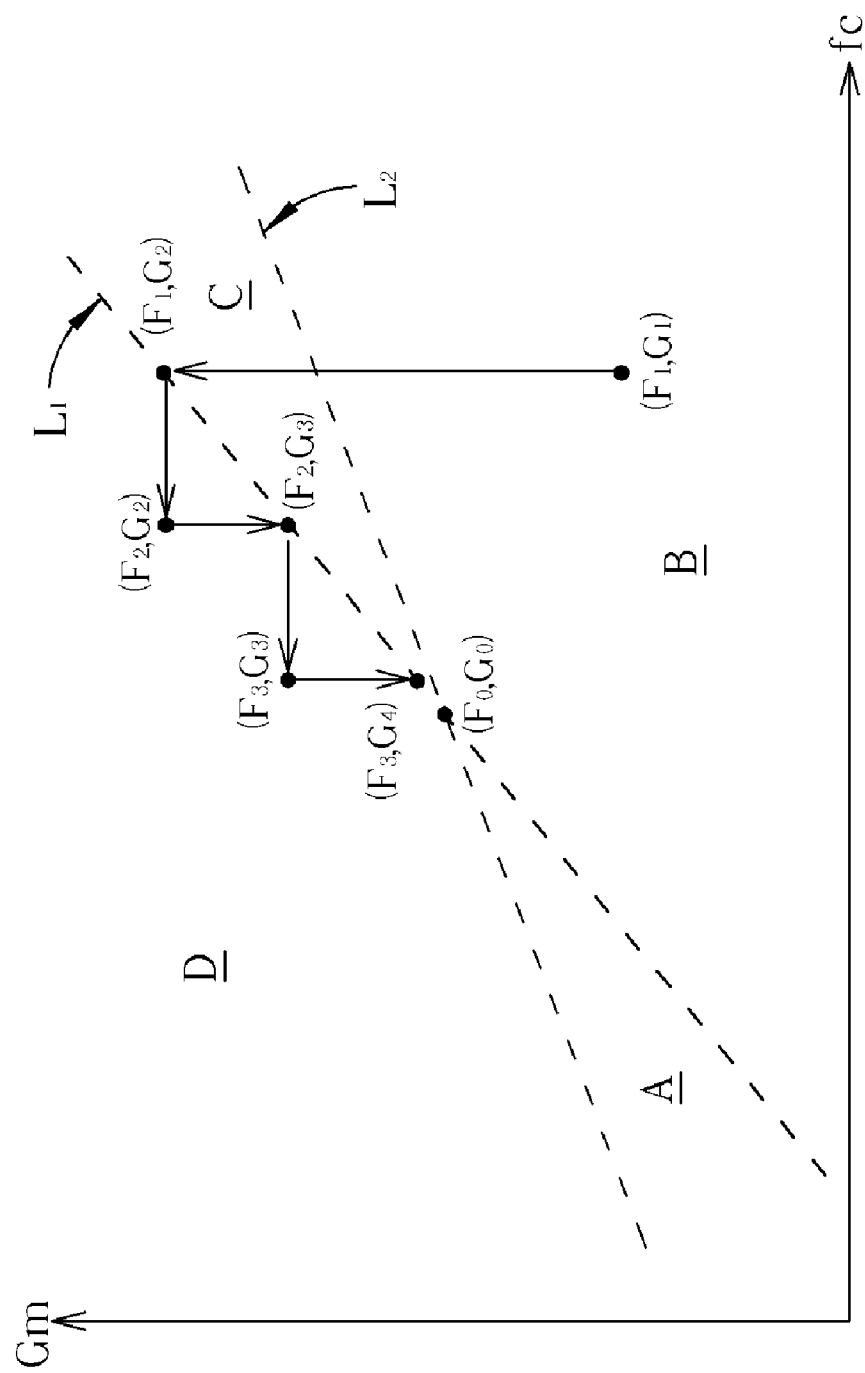
FIG. 2 is a diagram illustrating the characteristic of an equalizer shown in FIG. 1.

Please refer to FIG. 2. FIG. 2 is a diagram illustrating the characteristic of the equalizer 102 shown in FIG. 1. The dotted line $L_1$ represents that the first expected value is equal to 3T, and the other dotted line $L_2$ represents that the second expected value is equal to 4T. Therefore, these two dotted lines $L_1$ and $L_2$ define four regions A, B, C, and D on the plane. As can be seen from the diagram, region A means that the average value of the measured 3T run lengths is greater than the ideal 3T run length, and average value of the measured 4T run lengths is less than the ideal 4T run length; region B means that the average value of the measured 3T run lengths is less than the ideal 3T run length, and the average value of the measured 4T run lengths is less than the ideal 4T run length; region C means that the average value of the measured 3T run lengths is less than the ideal 3T run length, and the average value of the measured 4T run lengths is greater than the ideal 4T run length; and region D means that the average value of the measured 3T run lengths is greater than the ideal 3T run length, and the average value of the measured 4T run lengths is greater than the ideal 4T run length.

As such, the equalizing parameters are to be adjusted if the first error value between the average value of measured run lengths in a selected run length set and the expected value of the selected run length does not lie in a predetermined range. The first error value is obtained by subtracting the expected value of the selected run length from the average value of measured run lengths in a selected run length set. An example of tuning the equalizing parameters is illustrated. As shown in FIG. 2, initially the setting for equalizing parameters, central frequency $f_c$ and boost $G_m$, is ($F_1$, $G_1$). The comparing module 114 compares the average value of the measured 3T run lengths with the expected value of 3T run length, detects the first error value, and determines that the average value of the measured 3T run lengths is greater than the expected value of the 3T run length. Therefore, the comparing module 114 then notifies the processor 106 of the comparing result. The processor 106 will implement an algorithm to the equalizer 102 in order to adjust the equalizing parameter, boost $G_m$, in a direction to reduce the first error value.

Once the difference, the first error value, between the average value of the measured 3T run lengths and the expected value of 3T run length lies within the desired first range, i.e. between threshold values $T_1$ and $T_2$, the average value of the measured 4T run lengths is compared with the expected value of the 4T run length to obtain the second error value by subtracting the expected value of the 4T run length from the average value of the measured 4T run lengths. Please note that the current setting for the equalizing parameters, central frequency $f_c$ and boost $G_m$, is ($F_1$, $G_2$). Then, the difference between the average value of measured 4T run lengths and the expected value of 4T run length is compared. The comparing module 114 detects the second error value, and determines that the average value of the measured 4T run lengths is less than the expected value of the 4T run length. Therefore, the comparing module 114 notifies the processor 106 of the comparing result. The processor 106 will implement another algorithm to the equalizer 102, in order to adjust the equalizing parameter, central frequency, in a direction that reduces the error. In this embodiment, the equalizing parameter, central frequency $f_c$, is tuned in steps of size d by the processor 106. Therefore, the setting for the equalizing parameters, central frequency $f_c$ and boost $G_m$, is ($F_2$, $G_2$). Please note that $F_2$ is equal to $F_1$ minus d.

As indicated by FIG. 2, the dotted lines $L_1$ and $L_2$ will cross at a certain point, which stands for an optimum setting ($F_0$, $G_0$) for the equalizing parameters, i.e. central frequency $f_c$ and boost $G_m$. In other words, if the equalizer 102 adopts the above optimum setting ($F_0$, $G_0$), the average value of measured 3T run lengths is equal to 3T and the average value of measured 4T run lengths is equal to 4T. However, since the current setting ($F_2$, $G_2$) for the equalizing parameters is unable to make the first error value between the average value of measured 3T run lengths and expected value of 3T run length fall in the desired first range and the second error value between the average value of measured 4T run lengths and expected value of 4T run length fall in the desired second range, the above-mentioned parameter tuning procedure is repeated. Therefore, as shown in FIG. 2, the setting ($F_2$, $G_2$) is updated by a new setting ($F_2$, $G_3$); the setting ($F_2$, $G_3$) is updated by a new setting ($F_3$, $G_3$), where $F_3$ is equal to $F_2$ minus d; and the setting ($F_3$, $G_3$) is updated by a new setting ($F_3$, $G_4$). After the equalizer 102 utilizes the setting ($F_3$, $G_4$) to set the equalizing parameters, central frequency $f_c$ and boost $G_m$, the comparing module 114 finds out that the second error value between the average value of measured 4T run lengths and the expected value of the 4T run length falls in the desired second range, i.e. between two threshold values $T_3$ and $T_4$. Therefore, the processor 106 will hold the current setting ($F_3$, $G_4$). That is, because the first error value between the average value of measured 3T run lengths and the expected value of 3T run length lies in the desired first range and the second error value between the average value of measured 4T run lengths and the expected value of 4T run length lies in the desired second range, the parameter tuning procedure is deemed successful even though the final setting ($F_3$, $G_4$) is different from the optimum setting ($F_0$, $G_0$). In addition, the above parameter tuning procedure will keep monitoring the measured run lengths to optimize the equalizing parameters set to the equalizer 102.

Figure 3:
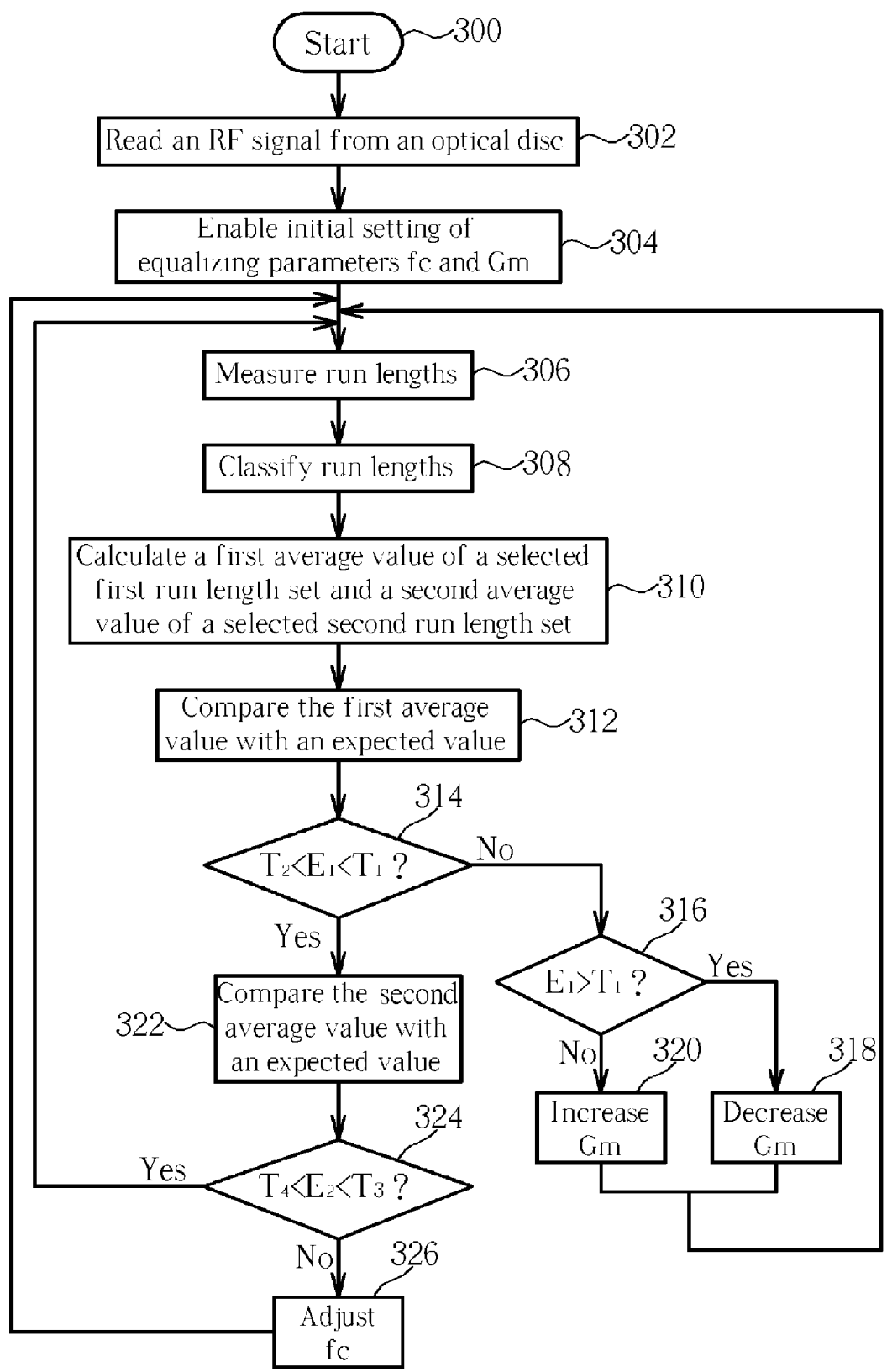
FIG. 3 is a flowchart illustrating the steps of equalizing frequency response of an optical disc signal.

Please refer to FIG. 3. FIG. 3 is a flowchart illustrating the steps of equalizing frequency response, as detailed in the previous paragraphs.

Step 300: Start;

Step 302: Read an RF signal from an optical disc;

Step 304: The equalizer 102 enables initial setting of equalizing parameters, central frequency $f_c$ and boost $G_m$;

Step 306: The measuring module 108 measures the run lengths of the RF signal;

Step 308: The classifying module 110 classifies the run lengths measured by the measuring module 108 into a plurality of run length sets, so the run length sets are in multiples of T from 3T to 11T;

Step 310: The calculating module 112 calculates a first average value of a selected first run length set and a second average value of a selected second run length set;

Step 312: The comparing module 114 compares the first average value with an expected value of the first run length set.

Step 314: Does an error value $E_1$ between the first average value and the expected value fall in a first range delimited by two threshold values $T_1$ and $T_2$? If yes, go to step 322; otherwise, go to step 316;

Step 316: Is the error value $E_1$ greater than the threshold value $T_1$? If yes, go to step 318; otherwise, go to step 320;

Step 318: The processor 106 decreases the equalizing parameter, boost $G_m$, set to the equalizer 102. Go to step 306;

Step 320: The processor 106 increases the equalizing parameter, boost $G_m$, set to the equalizer 102. Go to step 306;

Step 322: The comparing module 114 compares the second average value with an expected value of the second run length set.

Step 324: Does an error value $E_2$ between the second average value and the expected value fall in a second range delimited by two threshold values $T_3$ and $T_4$? If yes, go to step 306; otherwise, go to step 326;

Step 326: The processor 106 utilizes a step size to adjust the other equalizing parameter, central frequency $f_c$, in a direction to reduce the error value $E_2$ of the second run length set. Then return to Step 306.

In the above-mentioned embodiment, the average value of measured 3T run lengths decreases as the equalizing parameter, boost $G_m$, decreases. If the architecture of the equalizer 102 is modified, the characteristic of the equalizer 102 might be changed. For example, the average value of measured 3T run lengths increases as the equalizing parameter, boost $G_m$, decreases. In this case, step 316 is modified to determine if the error value $E_1$ is lower than the threshold value $T_2$, and step 324 is modified to determine if the error value $E_2$ between the second average value and the expected value falls in the second range. Similarly, adjustment to the other equalizing parameter, central frequency $f_c$, varies with the architecture of the equalizer 102. In the above-mentioned embodiment, the equalizing parameter, central frequency $f_c$, decreases in a predetermined step size if the error value between the average value of measured 4T run lengths and the expected value of the 4T run length is above the desired second range. However, in another embodiment having an equalizer with a specific architecture, the equalizing parameter, central frequency $f_c$, increases in a predetermined step size if the error value between the average value of measured 4T run lengths and the expected value of the 4T run length is above the desired second range. In this case, step 326 should be updated accordingly to the design requirements. The same objective of finding out the optimum setting of equalizing parameters is achieved.

Unlike the prior art, the present invention can adjust the parameters in a correct direction without a method of trial and error. Equalization by observing run length rather than jitter is therefore more efficient and achieves efficiency and speed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for signal equalization in a light storage system, the method comprising:

measuring a plurality of run lengths of a signal;

classifying measured run lengths into a plurality of run length sets;

calculating a first average value of a first run length set corresponding to a first run length;

calculating a second average value of a second run length set corresponding to a second run length;

comparing the first average value with a first expected value of the first run length set to determine a first difference value;

comparing the second average value with a second expected value of the second run length set to determine a second difference value; and adjusting a first parameter to reduce the first difference value and adjusting a second parameter to reduce the second difference value until the first difference value falls within a first range and the second difference value falls within a second range.

2. The method of claim 1 wherein the first parameter is to set boost applied to equalizing the signal.

3. The method of claim 2 wherein the second parameter is a central frequency.

4. The method of claim 1 wherein the first expected value is equal to the first run length, and the second expected value is equal to the second run length.

5. The method of claim 4 wherein the first run length is 3T run length, and the second run length is 4T run length.

6. The method of claim 1 wherein the step of adjusting the first and second parameters further comprises:

if the first difference value is above the first range, decreasing the first parameter;

if the first difference value is below the first range, increasing the first parameter;

if the second difference value is above the second range, decreasing the second parameter; and if the second difference value is below the second range, increasing the second parameter.

7. The method of claim 1 wherein the step of adjusting the first parameter and the step of adjusting the second parameter are performed alternately.

8. The method of claim 6 wherein the step of adjusting the first and second parameters is performed by applying a predetermined step size.

9. An apparatus for signal equalization in a light storage system, the apparatus comprising:
   a run length meter comprising:
   a measuring module for measuring a plurality of run lengths of the signal;
   a classifying module coupled to the measuring module for classifying measured run lengths into a plurality of run length sets;
   a calculating module coupled to the classifying module for calculating a first average value of a first run length set corresponding to a first run length and for calculating a second average value of a second run length set corresponding to a second run length; and
   a comparing module, coupled to the calculating module, for comparing the first average value with a first expected value of the first run length set to determine a first difference value and for comparing the second average value with a second expected value of the second run length set to determine a second difference value; and
   a processor, coupled to an equalizer and the run length meter, for adjusting a first parameter to reduce the first difference value and adjusting a second parameter to reduce the second difference value until the first difference value falls within a first range and the second difference value falls within a second range.

10. The apparatus of claim 9 wherein the first parameter is to set boost.

11. The apparatus of claim 10 wherein the second parameter is a central frequency.

12. The apparatus of claim 9 wherein the first expected value is equal to the first run length, and the second expected value is equal to the second run length.

13. The apparatus of claim 12 wherein the first run length is 3T run length, and the second run length is 4T run length.

14. The apparatus of claim 9 wherein the processor adjusts the first and second equalizing parameters by:
   if the first difference value is above the first range, decreasing the first equalizing parameter;
   if the first difference value is below the first range, increasing the first equalizing parameter;
   if the second difference value is above the second range, decreasing the second equalizing parameter; and
   if the second difference value is below the second range, increasing the second equalizing parameter.

15. The apparatus of claim 9 wherein the processor alternately adjusts the first parameter and the second parameter.

16. The apparatus of claim 15 wherein the processor adjusts the parameters by applying a predetermined step size.

* * * * *